UNITED STATES PATENT OFFICE.

ERNEST EDWARD MUNRO PAYNE, OF AYLESBURY, ENGLAND, ASSIGNOR OF ONE-HALF TO WILLIAM HENRY STAYNES, JOHN HARDY SMITH, AND WALTER HENRY STURGES, OF LEICESTER, ENGLAND.

TANNING EXTRACT FROM PEAT.

No. 899,800.      Specification of Letters Patent.      Patented Sept. 29, 1908.

Application filed September 26, 1904. Serial No. 226,024.

*To all whom it may concern:*

Be it known that I, ERNEST EDWARD MUNRO PAYNE, a subject of the King of England, residing at Aylesbury, in the county of Buckingham, England, have invented certain new and useful Improvements in Tanning Extracts from Peat, of which the following is a specification.

This invention relates to improvements in the preparation of extracts for the production of leather.

According to this invention in preparing an extract for the production of leather peat or turf is comminuted and macerated in an alkaline solution (such as a solution of caustic soda, caustic potash, alkaline carbonates or the like) the resulting liquor is pressed out and allowed to drain or percolate so that a fairly clear or bright liquor is obtained. This liquor is then treated with a suitable quantity of acid and this yields a product which is a somewhat diluted extract capable of producing leather.

If desired, a solid leather producing extract may be obtained, either by evaporation of the diluted extract described above or, when dealing with insoluble modifications of the extract, by adding a sufficient quantity of acid to the resulting liquor until complete precipitation takes place, when the extract can be separated out and used if desired in conjunction with certain solvent salts of neutral composition such for example as sodium acetate.

In treating skins to produce leather in accordance with this invention, it is essential that the extract should be used in conjunction with an acid. The liquors containing the extract may be neutralized by the addition of a suitable acid before the skins are placed therein or the necessary acid treatment may take place subsequently.

In order to produce leather of good commercial quality according to this invention, the skins are prepared in the usual way for tanning and they may be brought by suitable treatment into an acid condition. They are then submitted to the action of the extract or material herein described by any suitable known process of handling and treatment, and leather is thus obtained. The skins, however, may be left in or brought to a basic or alkaline condition and treated with the extract, being finally converted into leather by a subsequent acid treatment.

The herein described extracts may also be used in what is known as combination tanning, *i. e.* where several leather-producing agents are employed together, and a very great variety of valuable and useful leather is produced by various combinations, some by simultaneous others by consecutive employments of the various tannages used it being essential, according to this invention, that the leather should be treated by the extract and by an acid.

The following are specific examples involving the general principles of this invention, but the materials and proportions would of necessity be varied, as they are in every leather-making process according to the requirements of the manufacturer.

A known quantity of disintegrated, dried, or wet peat is taken (this of course varies in composition according to age and locality). The amounts of total solids and ash contained in a sample are estimated. As in the ordinary process of tanner's bark leaching, for every thousand pounds of total solids minus ash contained in the peat, there is added one thousand gallons of caustic soda solution at the ordinary temperature (of 1% strength NaHo). After digesting for twenty-four hours, the liquor is drained off, returned to the top of the vat and a further twenty-four hours is allowed to insure the solution of the leather-producing principles contained in the peat. This marc is then drained, pressed and the resulting liquor is collected.

(1) This liquor is treated with a solution of sulfuric acid (oil of vitriol) in such a proportion as will saturate the whole of the sodium base existing in the liquid as determined by analysis. A thick magma is produced which when filter-pressed and dried will yield a product which when dissolved is capable of making leather under certain circumstances for example, if this magma is dissolved in a 2% solution of sodium acetate, the solution can be used directly for producing leather from skins.

(2) The liquor is treated with sulfuric acid until only the free alkali, if any, is neutralized. It is then evaporated to a syrupy consistency for purposes of transit or concentration and is immediately available for use as a leather-producing agent.

(3) The liquor is treated with acetic acid until almost the whole of the sodium base, combined or free, existing in the liquor is neutralized and the resulting liquor is immediately available for use as a leather-producing agent. The exact amount of soda required for the peat can, of course, be determined by a simple preliminary test, it being borne in mind that as the moisture in the peat varies from say 30% to 80% the dilution of the caustic soda will be correspondingly effected.

The amount of acid required for the treatment say of 1000 gallons of resulting liquor either to neutralize the free alkalinity or to neutralize the total alkalinity is ascertained by titration of a sample.

What I claim as my invention and desire to secure by Letters Patent is:—

A process of preparing a leather-producing extract by comminuting peat, macerating it with a solution of caustic alkali, filtering and treating the liquid with sulfuric acid until the solid leather-producing extract is precipitated, separating the precipitate and dissolving it in a solution of sodium acetate.

In testimony whereof I have signed my name to this specification in the presence of two subscribing witnesses.

ERNEST EDWARD MUNRO PAYNE.

Witnesses:
WILLIAM H. BALLANTYNE,
HARRY B. BRIDGES.